(12) United States Patent
Münch et al.

(10) Patent No.: US 10,746,598 B2
(45) Date of Patent: Aug. 18, 2020

(54) SPECTROMETER ARRANGEMENT

(71) Applicant: Analytik Jena AG, Jena (DE)

(72) Inventors: Stefan Münch, Berlin (DE); Michael Okruss, Potsdam (DE)

(73) Assignee: Analytik Jena AG, Jena (DE)

(*) Notice: Subject to any disclaimer, the term of this patent is extended or adjusted under 35 U.S.C. 154(b) by 0 days.

(21) Appl. No.: 16/429,220

(22) Filed: Jun. 3, 2019

(65) Prior Publication Data

US 2019/0368933 A1    Dec. 5, 2019

(30) Foreign Application Priority Data

Jun. 4, 2018   (DE) .................. 10 2018 113 235

(51) Int. Cl.
*G01J 3/28* (2006.01)
*G01J 3/18* (2006.01)

(52) U.S. Cl.
CPC .......... *G01J 3/2823* (2013.01); *G01J 3/1809* (2013.01); *G01J 2003/1828* (2013.01); *G01J 2003/282* (2013.01); *G01J 2003/2813* (2013.01)

(58) Field of Classification Search
CPC ........ G01J 3/28; G01J 3/18; G01J 3/02; G01J 3/22; G01J 3/443; G01J 3/00; G01J 3/26
See application file for complete search history.

(56) References Cited

U.S. PATENT DOCUMENTS

2011/0285993 A1* 11/2011 Becker-Ross ............ G01J 3/02
356/305

FOREIGN PATENT DOCUMENTS

| CN | 103175611 A1 | 6/2013 |
| DE | 102016124980 A1 | 8/2017 |
| EP | 0744599 B1 | 2/2005 |

OTHER PUBLICATIONS

Foreman, William T., Lens Correction of Astigmatism in a Czerny-Turner Spectrograph, Applied Optics, vol. 7, No. 6, Jun. 1968, 7 pp. (1053-1059).

* cited by examiner

*Primary Examiner* — Abdullahi Nur
(74) *Attorney, Agent, or Firm* — Kelly J. Smith; PatServe

(57) ABSTRACT

The present disclosure resides in a spectrometer arrangement including a first dispersing element for spectral separation of radiation in a main dispersion direction, and a second dispersing element for spectral separation of radiation in a cross-dispersion direction, which is at an angle to the main dispersion direction, so that a two-dimensional spectrum is producible. The spectrometer arrangement also includes a collimating optics, which directs collimated radiation to the first and/or second dispersing element, a camera optics, which images a two-dimensional spectrum in an image plane, a two-dimensional detector for detecting the two-dimensional spectrum in the image plane, and an off-axis section of a rotationally symmetric, refractive element, which is arranged between the camera optics and the detector. The present disclosure resides likewise in an optical module comprising such a spectrometer arrangement.

14 Claims, 4 Drawing Sheets

SPECTROMETER ARRANGEMENT

CROSS-REFERENCE TO RELATED APPLICATION

The present application is related to and claims the priority benefit of German Patent Application No. 10 2018 113 235.2, filed on Jun. 4, 2018, the entire contents of which are incorporated herein by reference.

TECHNICAL FIELD

The invention relates to a spectrometer arrangement and to an optical module comprising such an arrangement.

BACKGROUND

An example of such a spectrometer arrangement is an echelle spectrometer with internal order separation. The problem to which the invention is directed will be explained in the following based on an echelle spectrometer.

Such a spectrometer arrangement is known, for example, from DE 10 2009 059 280 A1.

In the case of an echelle spectrometer, the gratings have a stepped cross section. Illuminating the short facet of the step-like structure with a corresponding blaze angle produces a diffraction pattern, which concentrates the diffracted intensity in high orders, e.g. in the fiftieth to one hundredth orders. In this way, high spectral resolutions can be achieved in compact arrangements. The orders can—, depending on occurring wavelengths—superimpose. The orders are in the case of echelle spectrometers dispersed with internal order separation, consequently a second time, crosswise to the dispersion direction of the echelle grating, in order to separate the different orders. One obtains, in this way, a two-dimensional spectrum, which can be registered with detector arrays.

An echelle spectrometer with internal order separation differs from echelle spectrometers with external order separation in that in the latter case only radiation from a small spectral region enters into the spectrometer. In the case of spectrometers with internal order separation, the spectrum is produced in the form of a two-dimensional structure in the detector plane. This structure is composed of spectral sections arranged essentially in parallel with one another. The free spectral regions of the particular diffraction orders give, together, a gapless spectrum for a certain wavelength range. The application of a detector array with a large number of detector elements permits the simultaneous registering of a large wavelength range with high spectral resolution.

In the case of spectrometer arrangements, the quality of the spectrum produced in the image area is limited by various imaging errors, especially by astigmatism, coma and/or spherical aberration. If the radiation of a wavelength in the case of the imaging of a point source is not concentrated in a single image point on the detector, but distributed on a larger area in the image plane, this degrades the spectral resolution of the spectrometer by broadening the image point in the dispersion direction and/or leads to a worsened signal-noise ratio by broadening the image point crosswise to the dispersion direction. In the special case of an echelle spectrograph, wherein a plurality of diffraction orders are imaged next to one another, imaging errors can be brought about, which lead to a broadening of the image point transversely to the main dispersion direction and an overlap between neighboring diffraction orders.

SUMMARY

An object of the invention is to improve the imaging quality of optical spectrometers by extensive reduction of optical imaging errors, such as astigmatism, coma and spherical aberrations.

The object is achieved by a spectrometer arrangement, comprising: a first dispersing element for spectral separation of radiation in a main dispersion direction; a second dispersing element for spectral separation of radiation in a cross dispersion direction, which is at an angle to the main dispersion direction, so that a two-dimensional spectrum is producible; a collimating optics, which directs collimated radiation to the first and/or second dispersing element; a camera optics, which images a spectrum in an image plane; a two dimensional detector for detecting the two-dimensional spectrum in the image plane; and an off-axis section of a rotationally symmetric, refractive element arranged between camera optics and detector.

In the spectrometer arrangement, the radiation of a light source is dispersed, i.e. directed through at least the first and/or second dispersing element wavelength dependently in different spatial directions. By imaging of the separated beam with the help of the camera optics, an image of the spectrum of the light source produced in an image plane is registered by the detector with sufficient spatial resolution.

By inserting an off-axis section of a rotationally symmetric, refractive element into the convergent beam path between camera optics and detector, a considerable lessening of the above mentioned imaging errors is achieved throughout the entire image field.

The arrangement of the refractive element between camera optics and detector is especially effective, since the individual beams are already relatively strongly geometrically separated and thus a "more individual" modification for the individual wavelengths is effected. The refractive element can correspondingly be better matched to the individual correction requirements of the beams. This is possible due to low beam overlap (see below). If a corresponding refractive element were used in the case of a parallel beam path, it would act similarly on all wavelength and a correction would affect all wavelengths similarly.

The arrangement of the refractive element as an optical correction element before the detector permits a very compact construction, since at the site the diameter of the set of beams of all detected wavelengths has already been strongly reduced.

The individual beams extend after the camera optics essentially in parallel toward the refractive element. By embodiment of the refractive element as a converging lens, and especially in the case of embodiment as a biconvex lens, the individual beams are pushed nearer together at the detector. The spectrum on the detector is thus somewhat smaller, such that the measuring range is expanded.

The individual rays within each beam travel, in contrast, with greater definition toward individual points on the detector. The rays within each beam are focussed by the camera optics onto the image plane and thus onto the detector. The many rays of a wavelength travel together and thus merge better through the action of the refractive element into an individual point. In other words, the spot images for the individual wavelengths are smaller, and the point spread function (PSF) is narrower.

The relative beam overlap is a percentage and can be calculated explicitly for two wavelengths. The relative beam overlap at a certain site in the beam path in the spectrometer arrangement is the reciprocal arithmetic ratio between the beam cross-sectional area of a selected monochromatic beam at such site and the surface area thereof, which is likewise occupied by a second monochromatic beam. The refractive element is arranged at a position, where the relative beam overlap is less than at the collimating optics. The relative beam overlap fulfills this condition only between camera optics and detector and in the convergent and divergent beam path in the region of an intermediate image. It does not fulfill this condition, however, in the parallel beam path, for instance, in the beam path before a dispersing element.

The concept of an "off-axis section of a rotationally symmetric, refractive element" likewise includes the partial illumination of a rotationally symmetric, refractive element away from its axis.

In an embodiment, the refractive element is embodied as a biconvex lens.

In an embodiment, is the lens embodied as a spherical lens.

The axis of the lens is defined as a line, which forms a right angle with both optical areas at the optical image center. An off-axis section of such a rotationally symmetric element is a volume section, which is not passed through centrally by the axis. The element is a section of a rotationally symmetric body, but, itself, is not rotationally symmetric.

In order to increase the performance of the refractive element further, in an embodiment, a non-spherical lens is used.

Fresnel reflections can occur on refractive optical elements. In this way, a number of unwanted reflections (stray light, or false light) can arise. In an embodiment, the refractive element includes because of this a broadband anti-reflection coating.

In the case of a measuring system, wherein the registered wavelength range can be varied, a low dispersing material is used as material of the refractive element for lessening chromatic aberrations, in an embodiment, for instance, calcium fluoride ($CaF_2$) as the material.

The determining of the optimal formation (radius of curvature, off-axis distance, lens thickness, lens material, orientation, position compared with the camera optics, position compared with the detector, lens twist) of the refractive element is accomplished in an embodiment by applying ray calculation programs. By formulation of a suitable goal function (merit function) and following application of optimizing algorithms to the optics design corresponding to the goal function, parameters can be found, with which the image point sizes are minimized throughout the entire image field. Also, the simultaneous improvement of further device characteristics can occur through formulation of a suitable merit function and subsequent optimizing of the discovered parameters.

As mentioned, the position of the refractive element before the detector is favorable, because the separation of the beams of the individual wavelengths has already strongly progressed (the relative beam overlap is small) and so the individual beams can be specifically affected. Even a relatively small set of adjustable parameters in the case of a spherical lens permits effectively addressing the different correction requirements of the various wavelengths.

In an embodiment, the collimating optics and/or the camera optics includes a concave mirror, especially a parabolic reflector or a spherical mirror.

In an embodiment, the first dispersing element is embodied as an echelle grating.

In an embodiment, the first dispersing element is replaced with a mirror arranged perpendicularly to the image plane of the detector, and the two dimensional detector is replaced by a one-dimensional detector. In this way, a prism spectrograph results.

In an embodiment, the second dispersing element is embodied as a prism.

In an embodiment, the prism is reflectively coated on the rear side.

In an embodiment, the prism is rotatably seated. In this way, the wavelength range to be examined can be set.

In an embodiment, the spectrometer arrangement forms a Littrow spectrometer. In this way, the collimator also forms simultaneously the camera mirror, which forms the image on the detector.

In an embodiment, the detector is embodied as a CCD array or as a CMOS detector.

The object is achieved further by an optical module for retrofitting a spectrometer arrangement such as above described, wherein the module includes at least the refractive element.

With the aid of the refractive element, not only the image quality of the spectrometer arrangement can be improved. Also other device characteristics can be changed, characteristics which are connected with the image quality. An option is increasing the etendue by increasing the aperture ratio while keeping uniform image quality compared with the starting design. There is further the opportunity of miniaturizing the spectrometer by reducing the focal length while increasing the aperture ratio and simultaneously maintaining the spectral resolving power. Because acceptable aberration values are achieved over a greater image area, in given cases, larger detectors can be used, in order so simultaneously to expand the registered wavelength range.

BRIEF DESCRIPTION OF THE DRAWINGS

The invention will now be explained in greater detail based on the appended drawing, the figures of which show as follows.

DETAILED DESCRIPTION

Figure 1:
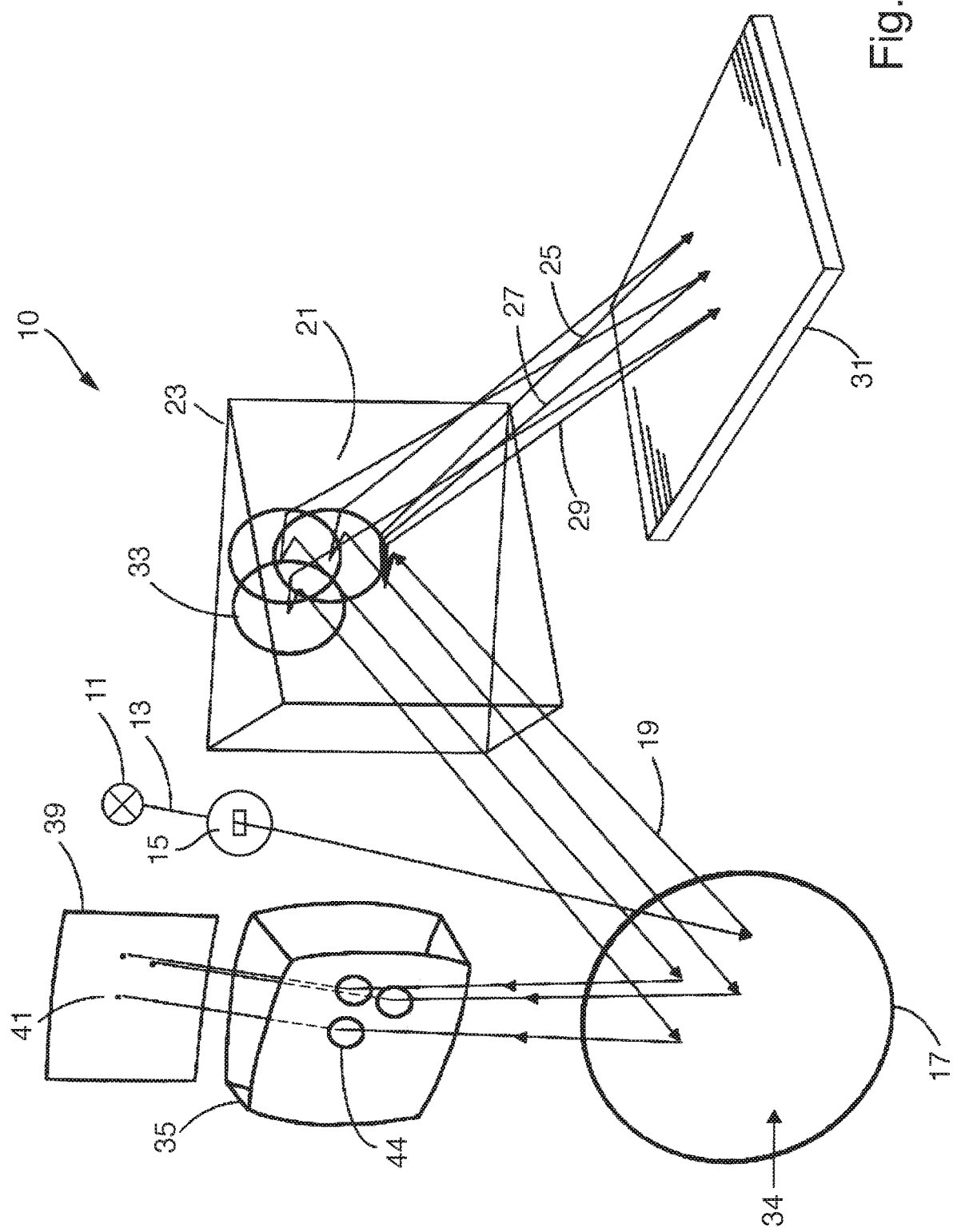
FIG. 1 shows an embodiment of the spectrometer arrangement of the present disclosure.

FIG. 1 shows an embodiment of the spectrometer arrangement 10 of the invention. The radiation of a radiation source 11 is directed as a combined beam 13 to the entrance slit 15 of a spectrometer arrangement 10, from where it enters into the actual spectrometer. Examples of such a light source 11 include a plasma torch, such as used in ICP-OES (inductively coupled plasma, optical emission spectrometry). In such case, wavelengths between 165 nm and 900 nm are registered with the system.

The light entering into the spectrometer includes radiation of all wavelengths emitted by the light source. By a collimating optics 17, e.g. a concave mirror, the light beam is parallelized 19. The collimated light strikes then on—in the wording the present invention—a second dispersing element, especially a prism 21, which functions as an optical order separating unit. The rear side 23 of the prism 21 is reflectively coated.

The radiation, predispersed by the prism, by way of example into beams 25, 27 and 29 with wavelengths $\lambda_1$, $\lambda_2$ and $\lambda_3$ respectively, passes from the prism 21 to the main dispersion element, an echelle grating 31. The radiation is diffracted by the echelle grating into a large number of diffraction orders with high order numbers. The orders are, in given cases, spatially still strongly superimposed at the grating 31. In the here illustrated Littrow arrangement, the beams travel from the grating back to the reflectively coated 23 prism 21, where the different wavelengths 25, 27, 29 are again dispersed now crosswise to the main dispersion direction. On the rear side of the prism, the beams of the different wavelengths $\lambda_1$, $\lambda_2$ and $\lambda_3$ (25, 27, 29) are significantly superimposed, because of the large beam diameters, see reference character 33. The relative beam overlap is thus large.

From the prism 21, the beams are directed to the concave mirror 17, which performs the imaging of the beam on the detector 39. The spectrometer arrangement is shown in a Littrow arrangement, i.e. the concave mirror 17 is also embodied as a camera optics 34.

Detector 39 is, for instance, a CCD detector in the form of a detector array (2-D detector). The detector has, for example, a resolution of 1000×1000. Detector 39 is oriented such that the individual columns are approximately oriented in the same way as the diffraction orders. The entire detector 39 is read-out at the same time.

On the path to the detector 39, the cross-sections of the beams become progressively smaller (because of the camera optics 34). Interposed on such path is a refractive element 35, through which the beams pass. The refractive element 35 is here embodied as a lens body. The two optically effective surfaces of the biconvex lens body are spherically embodied. In order to keep chromatic aberrations induced by the lens body 35 as small as possible, $CaF_2$ is used as material of the lens body. Additionally, the optically effective surfaces of the lens body 35 are provide with an anti-reflective coating, in order to limit as much as possible false light falling on the detector 39. At the correcting lens 35, the beam diameters are already so small that for the here illustrated wavelength examples a complete beam separation is already present, see reference characters 44. The relative beam overlap is thus small.

In general, the refractive element 35 is an off-axis section of a rotationally symmetric, refractive element.

The corrected beams of the wavelengths $\lambda_1$, $\lambda_2$ and $\lambda_3$ (reference characters 25, 27, 29) are directed further to the detector unit 39. Through the correction provided by the prismatic lens body 35, very sharp image points can be produced in the image plane 41 on the detector. The position of the correction-lens body 35 in the immediate proximity of the detector 39 is, because of the good beam separation, suitable in special measure for increasing the image quality. Due to the beam separation, the individual beams are strongly individually correctable, in order to minimize previously occurring aberrations. Also, the increasingly smaller diameter of the group of beams permits a smaller dimensioning of the correcting element. Due to the biconvex embodiment of the lens body, there results in the here proposed example a lessening of the dimensions of the displayed spectrum on the detector. In this way,—assuming uniform detector- and pixel size—the simultaneously registrable wavelength range is enlarged in given cases, however, the spectral resolution lessens only slightly. By reduced optical imaging errors, however, as a whole, a significantly better spectral resolution is achieved.

Instead of the echelle grating as main dispersion element 31, a mirror standing perpendicular to the spectrometer plane can be applied. There results a pure prism spectrograph, which profits in like measure from the above described aberration correction provided by the prismatic lens body. Due to the strongly reduced aberrations, use of slits with large slit height is possible. The slit orientation changes compared with an echelle spectrometer by 90°, so that a strong improvement of the geometric etendue of the spectrometer results.

Figure 2:
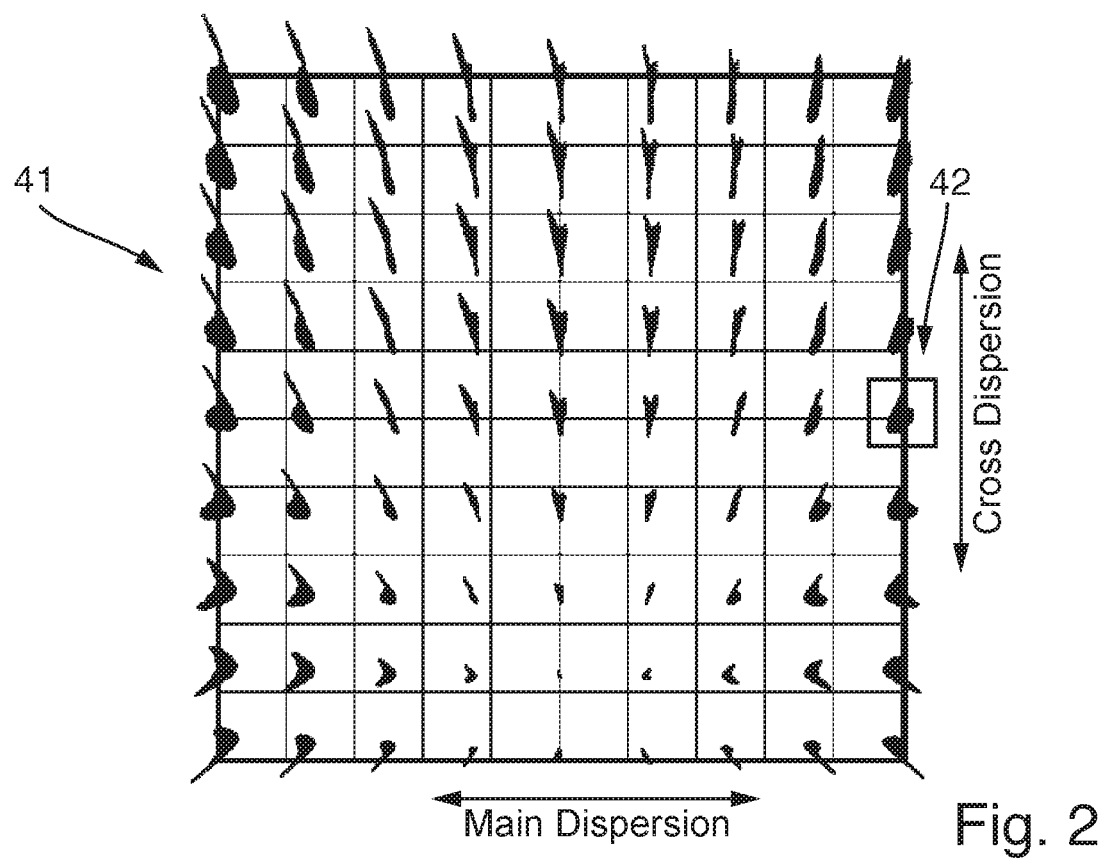
FIG. 2 shows aberrations measured with an uncorrected spectrometer arrangement.
Figure 4:
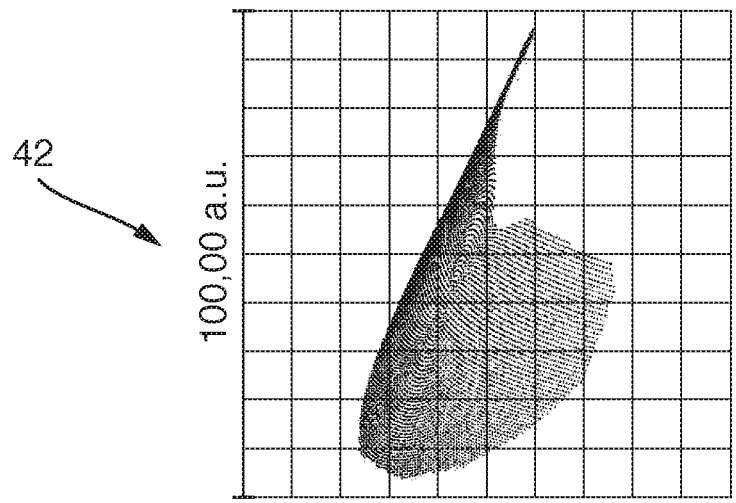
FIG. 4 shows an individual spot of FIG. 2.

FIG. 2 shows aberrations for an uncorrected spectrometer arrangement. FIG. 4 represents a corresponding, single spot 42.

Figure 3:
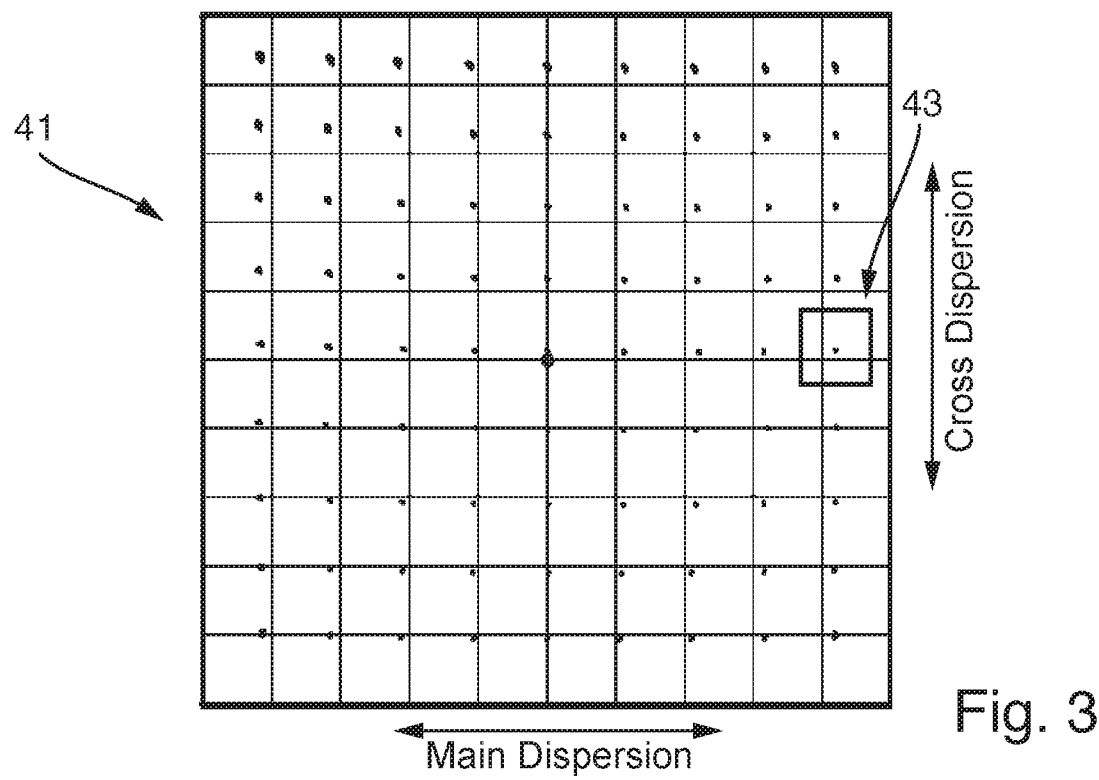
FIG. 3 shows aberrations measured with an arrangement of FIG. 1.

FIG. 3 shows the achievable image quality throughout the entire image field 41 with a spectrometer arrangement 10 such as above described with correcting optics 35. The optical arrangement is a Littrow spectrograph with a focal length of 400 mm and an aperture ratio of f/12.5. Applied as collimator/camera is an off-axis, parabolic mirror. The grating is an R4 echelle grating. Using a detector with an area of 20.5×20.5 $mm^2$, a wavelength range between 380 nm (upper detector edge) and 900 nm (lower detector edge) is simultaneously registered in the illustrated beam calculation simulations. The illustrated spots represent the images of different wavelengths in a single point source. The image points are magnified by a factor of 15 compared with the scale of the detector area. The optical system—especially the embodiment of the prismatic lens 35—was optimized for the above mentioned wavelength range. The aberrations can be reduced many times throughout the entire image field with the correcting lens 35. In comparison with the uncorrected system, the same spectral region occupies less space in main- and cross dispersion directions. Boxed in FIGS. 2 and 3 is the single spot shown enlarged in FIGS. 4 and 5, respectively.

Figure 5:
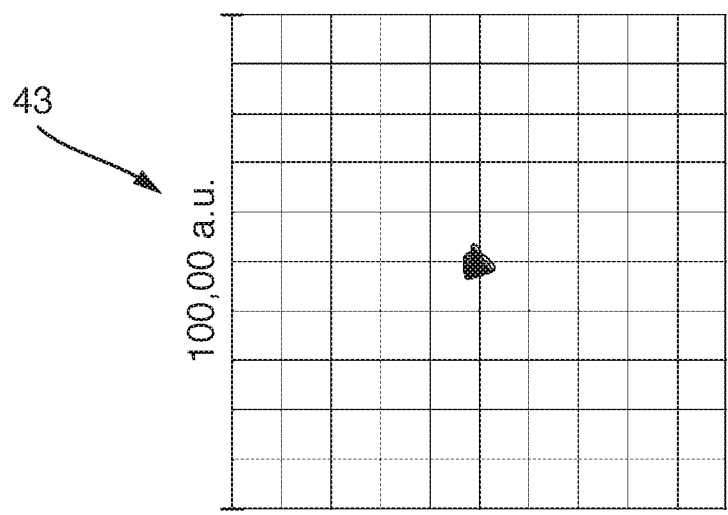
FIG. 5 shows an individual spot of FIG. 3.

FIG. 5 shows the image quality for a single spot 43 coming from a prismatic correcting lens 35, in a setup as illustrated in FIG. 1. The parameters of the correcting lens, such as, for instance, position, orientation, radius of curvature and off-axis distance, were so determined that the spot sizes can be reduced as strongly as possible throughout the entire image field. The expanse of spots can be markedly reduced throughout the entire image field. The benefit of the system for a large part of the covered wavelength region is now limited by the diffraction.

Figure 6:
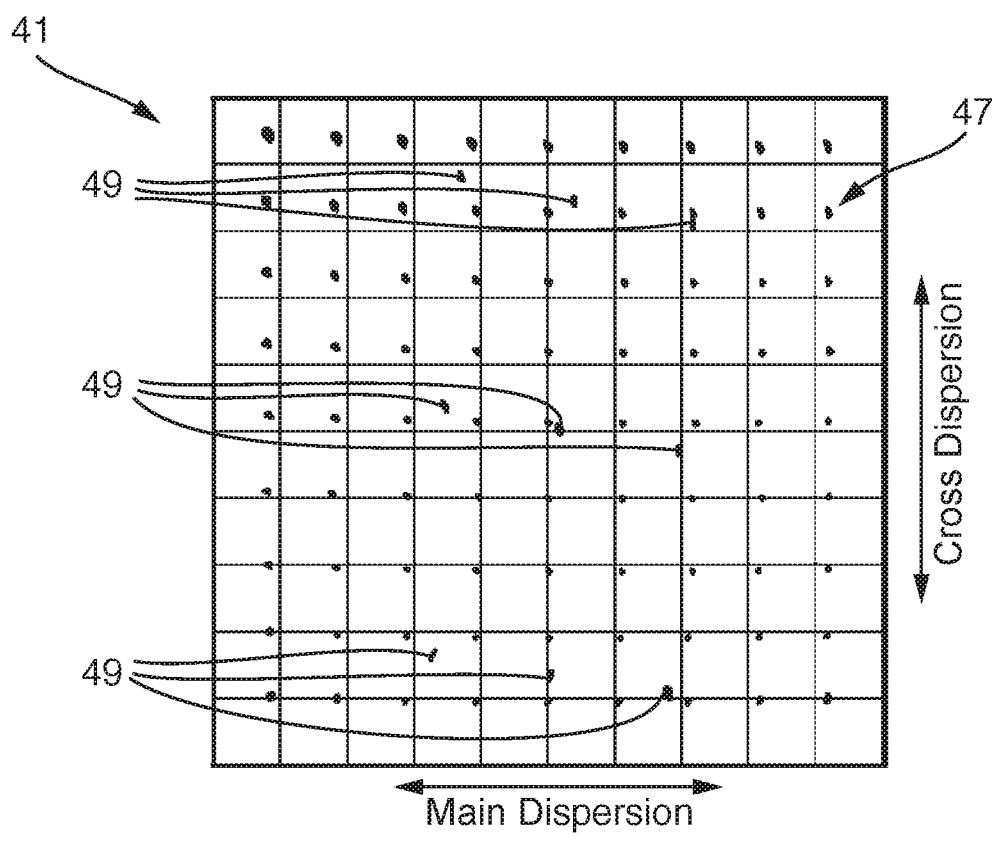
FIG. 6 shows aberrations measured with an arrangement of FIG. 1 with additional wavelengths.

As mentioned, the design of the correcting lens 35 was for a wavelength range between 380 nm and 900 nm. In the case of echelle spectrometers with a prism as cross dispersion element, optimizing for longwave regions is beneficial, because the diffraction orders lie always closer together with increasing wavelength: in order to achieve a separation of the diffraction orders in the case of as great as possible slit height at the entrance slit 15, a best possible image quality in this wavelength range is desirable. By a rotation of the prism 21, however, also other, especially shorter wave wavelength ranges can be led to the detector 39. FIG. 6 shows that the chromatic aberrations induced by the refractive element 35 are comparatively small. Shown besides selected wavelengths of the longwave region (red; reference character 47) are also 9 points in the shortwave region (blue; reference characters 49) in a wavelength range between 165 nm and 171 nm. The aberrations are, however, likewise significantly smaller than in the uncorrected state. Due to the lesser width of the free spectral region of the diffraction orders for shorter wave light, the spots are located only centrally in the detector in the main dispersion direction. Farther left or right lying detector regions in the shortwave measuring range remain unused.

The invention claimed is:

1. A spectrometer arrangement, including:
   a first dispersing element for spectral separation of radiation in a main dispersion direction;
   a second dispersing element for spectral separation of radiation in a cross-dispersion direction, which is at an angle to the main dispersion direction, so that a two-dimensional spectrum is producible;
   a collimating optics, which directs collimated radiation to the first and/or second dispersing element;
   a camera optics, which images a two-dimensional spectrum in an image plane;
   a two-dimensional detector for detecting the two-dimensional spectrum in the image plane; and
   an off-axis section of a rotationally symmetric, refractive element, which is arranged between the camera optics and the two-dimensional detector.

2. The spectrometer arrangement of claim 1, wherein the refractive element is embodied as a biconvex lens.

3. The spectrometer arrangement of claim 1, wherein the refractive element is embodied as a spherical lens.

4. The spectrometer arrangement of claim 1, wherein at least one lens area is embodied aspherically.

5. The spectrometer arrangement of claim 1, wherein the refractive element includes an anti-reflective coating.

6. The spectrometer arrangement of claim 1, wherein the refractive element is manufactured from a low dispersing material.

7. The spectrometer arrangement of claim 1, wherein the collimating optics and/or the camera optics includes a concave mirror.

8. The spectrometer arrangement of claim 1, wherein the first dispersing element is embodied as an echelle grating.

9. The spectrometer arrangement of claim 1, wherein the first dispersing element is replaced with a mirror arranged perpendicularly to the image plane of the two-dimensional detector, and wherein the two-dimensional detector is replaced by a one-dimensional detector.

10. The spectrometer arrangement of claim 1, wherein the second dispersing element is embodied as a prism.

11. The spectrometer arrangement of claim 10, wherein the prism is reflectively coated on a rear side.

12. The spectrometer arrangement of claim 10, wherein the prism is rotatably seated.

13. The spectrometer arrangement of claim 1, wherein the spectrometer arrangement forms a Littrow spectrometer.

14. An optical module for retrofitting a spectrometer arrangement, including:
   wherein the spectrometer arrangement includes a first dispersing element for spectral separation of radiation in a main dispersion direction, a second dispersing element for spectral separation of radiation in a cross-dispersion direction, which is at an angle to the main dispersion direction, so that a two-dimensional spectrum is producible, a collimating optics, which directs collimated radiation to the first and/or second dispersing element, a camera optics, which images a two-dimensional spectrum in an image plane, and a two-dimensional detector for detecting the two-dimensional spectrum in the image plane;
   at least a rotationally symmetric, refractive element, an off-axis section of which is configured for positioning between the camera optics and the two-dimensional detector.

* * * * *